United States Patent [19]
Kausch

[11] Patent Number: 5,257,697
[45] Date of Patent: Nov. 2, 1993

[54] PACKAGE FOR SHEETS OF PHOTOSENSITIVE MATERIAL

[75] Inventor: Thomas J. Kausch, Rochester, N.Y.

[73] Assignee: Eastman Kodak Company, Rochester, N.Y.

[21] Appl. No.: 982,214

[22] Filed: Nov. 25, 1992

[51] Int. Cl.⁵ .............................................. B65D 81/30
[52] U.S. Cl. .................................... 206/455; 378/184
[58] Field of Search ............... 206/449, 455, 456, 484; 354/275; 378/182, 184

[56] References Cited

U.S. PATENT DOCUMENTS

| | | |
|---|---|---|
| 4,309,466 | 1/1982 | Stillman . |
| 4,513,050 | 4/1985 | Akao . |
| 4,623,587 | 11/1986 | Ito et al. . |
| 4,661,395 | 4/1987 | Akao . |
| 4,663,218 | 5/1987 | Akao . |
| 4,701,359 | 10/1987 | Akao . |
| 4,780,357 | 10/1988 | Akao . |
| 4,876,125 | 10/1989 | Akao et al. . |
| 4,922,511 | 5/1990 | Gay ....................... 378/182 |
| 4,955,479 | 9/1990 | Beer et al. ............ 206/455 |
| 5,017,429 | 5/1991 | Akao . |
| 5,019,447 | 5/1991 | Keller . |
| 5,019,849 | 5/1991 | Harrison . |
| 5,048,686 | 9/1991 | Kausch et al. . |
| 5,073,421 | 12/1991 | Akao . |
| 5,110,639 | 5/1992 | Akao . |
| 5,118,563 | 6/1992 | Akao . |

FOREIGN PATENT DOCUMENTS

1062043  6/1983  Italy .
2-091640A  3/1990  Japan .

*Primary Examiner*—Jimmy G. Foster
*Attorney, Agent, or Firm*—Frank Pincelli

[57] ABSTRACT

A package for enclosing a plurality of sheets of a photosensitive material. The package comprises a pouch for enclosing the sheets and a leader secured at one end of the pouch for removing the pouch from the sheets placed therein. The pouch includes a first laminate structure and a second laminate structure located in generally parallel planes. The first and second laminate structures each having an inner layer made of a first material and an outer layer made of a second material. The first and second laminate structures each having a leading edge and the first and second laminate structures being positioned such that the inner layers of the first and second structures face each other and the leading edge of the one of the laminate structures extends past the other leading edge so as to form an attachment section. The sheets being positionable between the first and second laminate structures. The leader is secured to the attachment section.

13 Claims, 5 Drawing Sheets

PACKAGE FOR SHEETS OF PHOTOSENSITIVE MATERIAL

FIELD OF THE INVENTION

The present invention relates to a package for enclosing a plurality of sheets of photosensitive material, such as a stack of x-ray film, with the package having a pouch and leader.

BACKGROUND OF THE PRESENT INVENTION

It is known to provide a light-tight package for holding a stack of sheets of x-ray film, or the like. The package may comprise a pouch, or bag, for holding the sheets, and a leader that projects from the end of the pouch. Such a film package is placed in a magazine having a spindle, and the leader is attached to the spindle. Then the magazine is closed and the spindle rotated to strip the packaging material from the stack of sheets. Packages of magazines generally of the kind described above are disclosed, for example, in U.S. Pat. No. 5,019,849, issued May 28, 1991; U.S. Pat. No. 5,048,686, issued Sep. 17, 1991; and Italian Patent No. 1,062,043. The leader using the package is often made of a material different from that used to manufacture the pouch. Initially, the leader is typically secured to the pouch either by ultrasonic welding techniques, heat sealing techniques or appropriate adhesives. It is often necessary and/or desirable to provide printed material on the outside of the package for describing the contents of the package and its intended use. Additionally, instructions are often provided for describing the proper installation and use of the package. On such packages it is important that the leader be firmly secured to the pouch so that when a force is applied to the leader, it can be pulled off the stack of sheets of material enclosed therein. However, packages of the prior art which have been suitable for providing printed material on the pouch have had the problem of firmly securing a leader to the pouch. It has been difficult to obtain good bonding strength between the leader and the pouch, especially when heat sealing techniques are used.

Applicant has invented a package construction which allows indicia to be printed on the outside of the pouch while also providing a strong bonding between the leader and the pouch.

BRIEF DESCRIPTION OF THE DRAWINGS

In the detailed description of the preferred embodiment presented below, reference is made to the accompanied drawings, in which.

SUMMARY OF THE INVENTION

Figure 1:
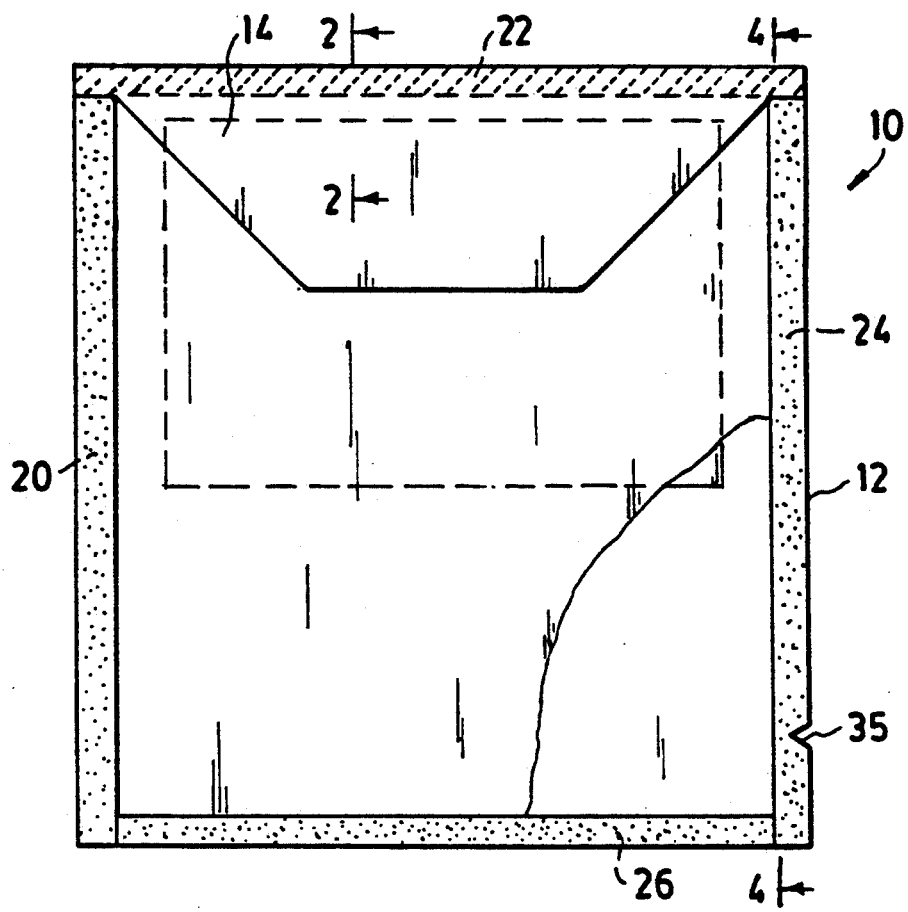
FIG. 1 is a plan view of a package made in accordance with the present invention having a stack of sheets of material enclosed therein.

A package for enclosing a plurality of sheets of a photosensitive material. The package comprises a pouch for enclosing the sheets and a leader secured at one end of the pouch for removing the pouch from the sheets placed therein. The pouch includes a first laminate structure and a second laminate structure located in generally parallel planes. The first and second laminate structures each having an inner layer made of a first material and an outer layer made of a second material. The first and second laminate structures each having a leading edge and the first and second laminate structures being positioned such that the inner layers of the first and second structures face each other and the leading edge of the one of the laminate structures extends past the other leading edge so as to form an attachment section. The sheets being positionable between the first and second laminate structures. The leader is secured to the attachment section.

DETAILED DESCRIPTION OF THE PREFERRED EMBODIMENT

Referring now to the drawings in detail, the package of the invention is generally designated 10 and can be constructed in a manner disclosed in the before mentioned co-pending U.S. application. Initially, the construction of such a package will be described, followed by a description of the package features of the present invention.

Package 10 comprises a pouch 12 and a leader 14. The pouch 12 can be formed from two generally planar flexible laminate structures 16 and 18 made of packaging material. This material is described in more detail later herein. The leader is cut from a sheet of a different kind of material from the material from which the pouch is made. The laminate structures 16,18 are of generally the same size and are located one above the other in generally parallel planes. They are initially secured together along edges thereof, for example, by lines of heat-sealing designated 20,22,24. Seals 20,24 are at the side edges of the pouch, while seal 22 is along the top, or leading edge, of the pouch 12. Initially, the bottom of the pouch 12 is open, and a stack of film sheets 30 is loaded into the pouch 12 through the open bottom.

The laminate structures 16,18 are sealed together at the bottom portion of the pouch by a line of heat-sealing 26, for example. This leaves the film in a light-tight space 28 between the sheets of laminate structures 16,18. As is typically done in the prior art, space 28 receives the stack of film sheets 30 positioned within a U-shaped carrier 32 which protects the film sheets 30 in the package 10. A notch 35 is provided in a side edge of laminate structure 16,18 part way through seal 24 to facilitate the tearing of the laminate structures 16,18 to remove the lower portion of the package after it is loaded into a magazine. The leader has a first and second end edges 34,36 that are generally parallel to each other and an edge 36 which is shorter than edge 34. The leader 14 also has side edges 38,40 that are perpendicular to edges 34 and extend a short distance toward edge 36. More specifically, the length of edges 38,40 are substantially equal to the width W of seal line 22. Leader 14 also includes side edges 42,44 that extend from edges 38,40 and taper inwardly as they approach edge 36 of the leader 14. Thus, the width of the leader 14 between the side edges 42,44 is less than the width of the edge 34 of the leader 14.

Figure 3:
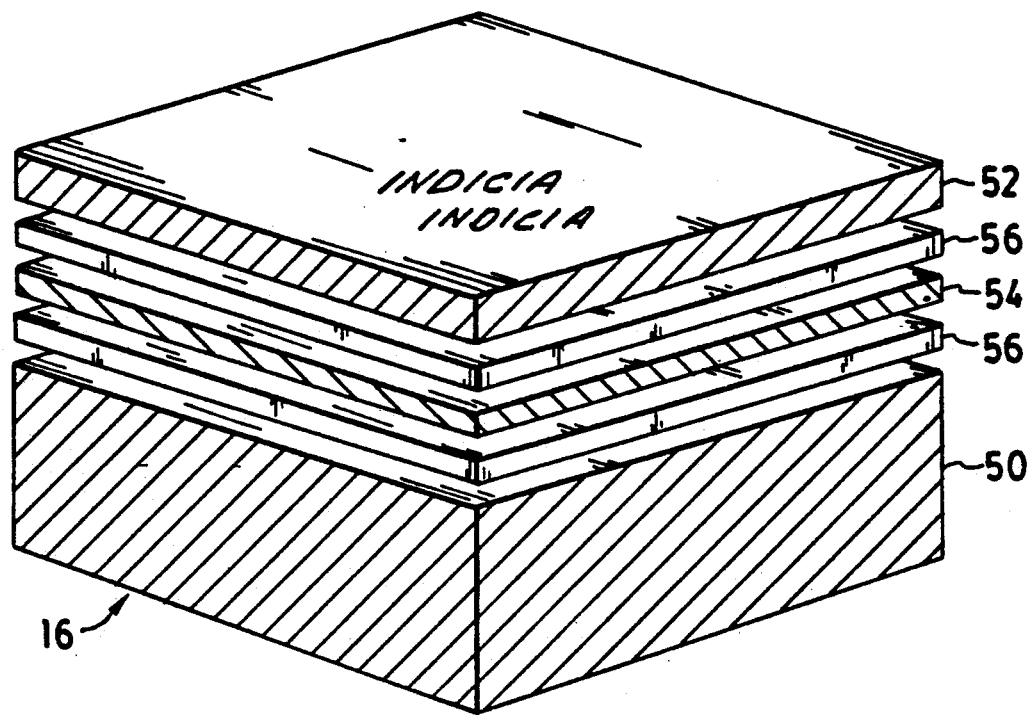
FIG. 3 is an enlarged exploded view of a portion of the laminated structure of one of the sheets of materials used to form the pouch.

Referring to FIG. 3, there is illustrated an enlarged exploded view of the laminate structure 16. While the following will be limited to discussing in detail the construction of laminate structure 16, it is to be understood that the laminate structure 18 is similarly constructed. The laminate structure 16 comprises an inner layer 50 made of a first material. In the particular embodiment illustrated, the inner layer 50 is made of a low density polyethylene (LDP) having a thickness of about 0.003 inches (00762 cms). In the embodiment illustrated, LDP was coex 30-398 purchased from Deerfield. Applicant has found that polyester or nylon is also suitable for use as the inner layer. The laminate structure 16 further includes an outer layer 52 made of a second material. In the particular embodiment illustrated, the outer layer is made of polypropylene and has a thickness of about 0.0007 inches (0.00178 cms). In the embodiment illustrated, the polypropylene used was 70 PRBU purchased from Intermix. The inner layer 50 has good securing properties, for example, by impulse heat sealing. Whereas the outer layer 52 does not have very good securing properties, but is capable of readily receiving and retaining printed matter thereon, but does not provide good sealing properties with the leader 14. In the particular embodiment illustrated, the laminate structure 16 includes a third middle layer 54 made of MET (metalized plastic film), for example, metalized oriented polyproplyene, for moisture protection. The middle layer 54 in the embodiment illustrated has a thickness of about 0.00075 inches (0.00197 cms). This layer is optional and may be omitted if so desired or substituted by another material such as polyester. A pair of adhesive layers 56 are provided for holding the laminate structure together. The adhesive layer may be of any suitable adhesive, for example, a polyethylene or solvent based adhesive. Appropriate indicia, such as instructions, description of the products or use is provided on the outer surface of outer layer 52. In the particular embodiment illustrated, indicia is applied by typical gravure printing or flexographic techniques utilizing a suitable ink. In particular, water soluble ink was used which was applied to bottom surface of the outer layer adjacent the middle layer for protection of the indicia.

Figure 2:
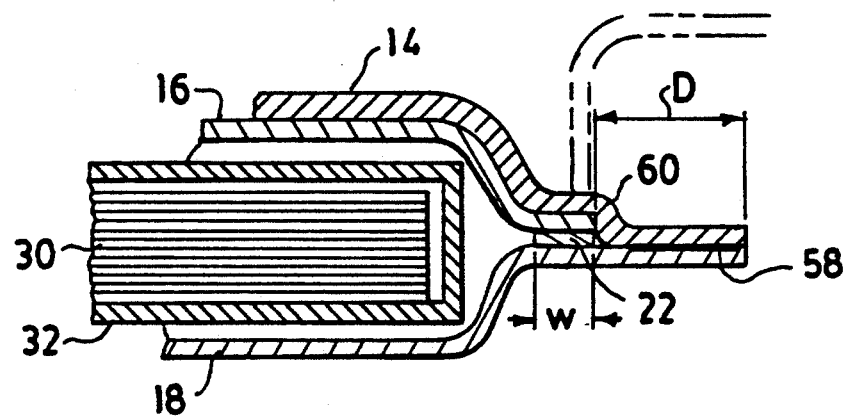
FIG. 2 is an enlarged partial cross-sectional view taken along line 2—2 of FIG. 1.
Figure 1A:
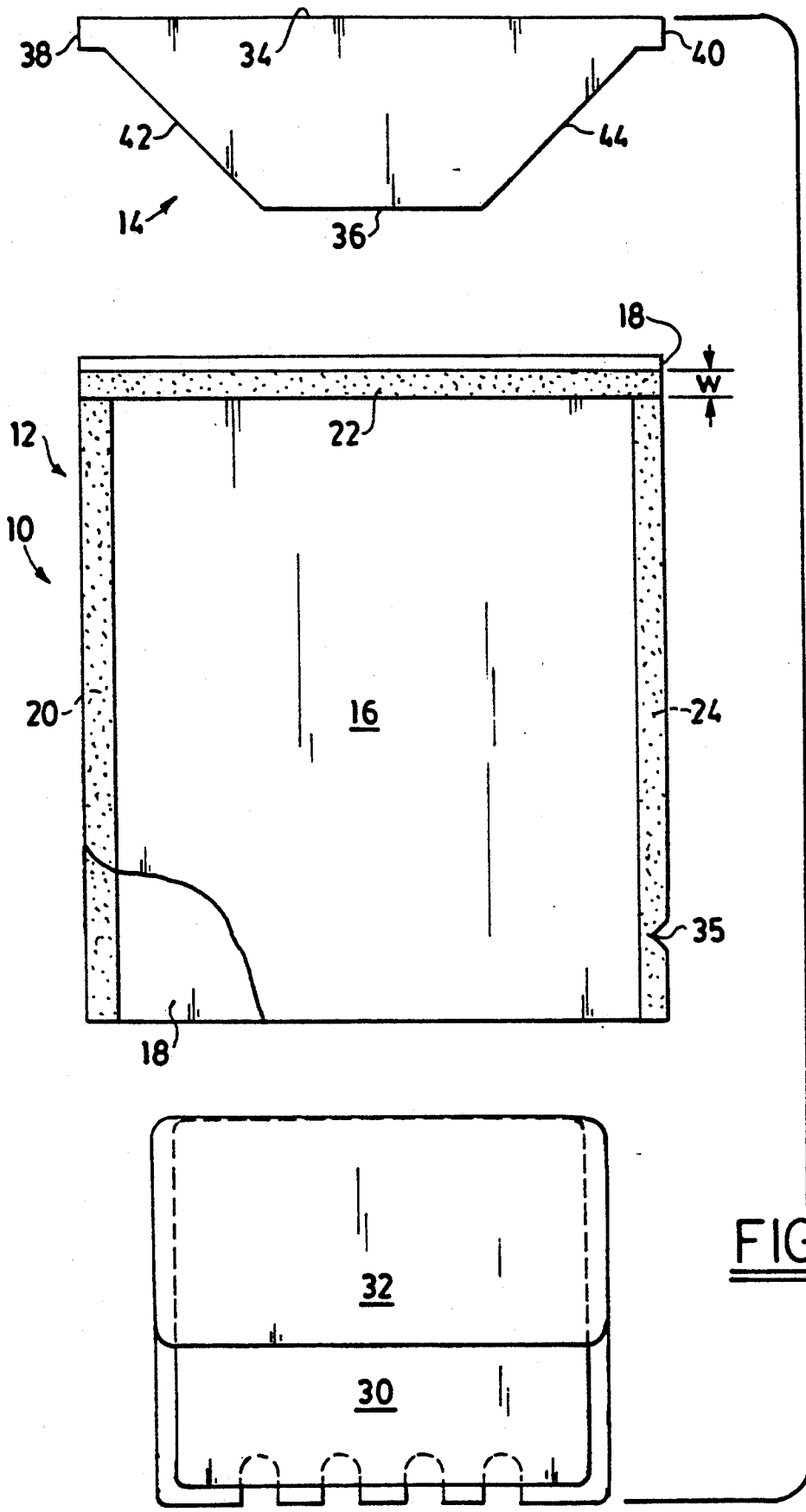
FIG. 1A is an exploded view of the package of FIG. 1, the pouch partially broken away to illustrate the bottom laminate structure and the sheets removed prior to sealing the lower end.

The pouch 12 is constructed such that one of the laminate structures adjacent where the leader 14 is secured to the pouch 12 extends beyond the other such that the inner layer 50 of one of the laminate structures is exposed and secured to the adjacent leader. In particular, referring to FIGS. 2, 4 and 5, it can be seen that the outer edge 58 of laminate structure 16 extends beyond the edge 60 of laminate structure 18. In the particular embodiment illustrated, the end 58 extends a distance D past the end 60 of laminate structure 18. In the particular embodiment illustrated distance D is approximately ½ inch (1.27 cms). The distance D need only be sufficient so that the leader 14 can be secured to the inner surface of the inner layer 50 of laminate structure 18. Thus, the distance D may be varied as desired. In this way, the leader 14, which is made of rubber modified high density polyethylene, is secured directly to the lower laminate structure. Since the material from which the leader 14 and the inner layer 52 are made are compatible, a strong heat-sealed bond is obtained therebetween.

Figure 4:
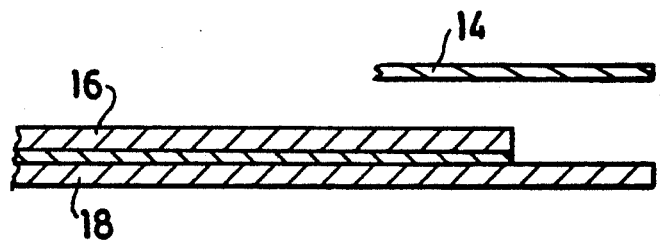
FIG. 4 is a side partial exploded cross-sectional view of the pouch of FIG. 1 illustrating the leader prior to being secured to the package.
Figure 5:
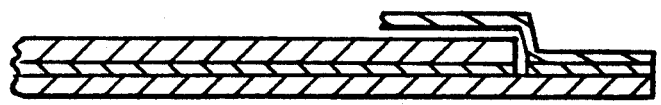
FIG. 5 is a view similar to FIG. 4 illustrating the leader secured to the pouch.

FIG. 4 illustrates the leader prior to being secured to the pouch 12. FIG. 5 illustrates the construction after the leader has been finally secured to the pouch 12. In the embodiment the leader 14 lies against the adjacent laminate structure 16. Referring the FIG. 2, there is illustrated in dash lines, the position of the leader 14 in the position it would take in removing the pouch 12 from the stack of film. As can be seen, the bonding between the leader 14 and the pouch 12 has been provided principally between the leader 14 and the inner layer 52 of the lower laminate structure 18.

Figure 6:
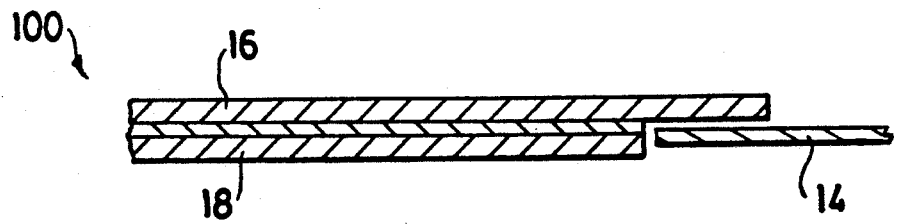
FIG. 6 is a partial cross-sectional view similar to FIG. 4 of a modified package made in accordance with the present invention prior to the leader being secured to the package.
Figure 7:
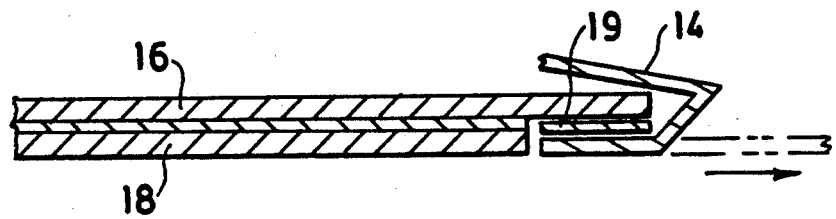
FIG. 7 is a view similar to FIG. 6 illustrating the package after the leader has been secured to the pouch and folded about the pouch.

Referring to FIGS. 6 and 7, there is illustrated a modified package 100 made in accordance with the present invention. In particular, package 100 is similar to package 10, like numerals indicating like parts. However, in this embodiment, instead of the leader 14 being secured to the bottom laminate structure 18, it is secured to the top laminate structure 16 and is folded about the upper laminate structure 16 instead of being folded back upon the adjacent outer layer of laminate structure 16 as shown in FIG. 5. Preferably, as illustrated, the leader 14 is secured to laminate structure 16 by a line 19 of heat sealing. The advantage of this construction is that there is no peeling action occurring between the leader 14 and the laminate structure to which it is secured when the package is being removed from the stack of sheets. Thus, leaving only the shearing action between the two for pulling of the package from the stack of sheets. The dash lines in FIG. 7 illustrate the leader in the position it would take during removal and the arrow indicates the direction of movement of the package.

Figure 8:
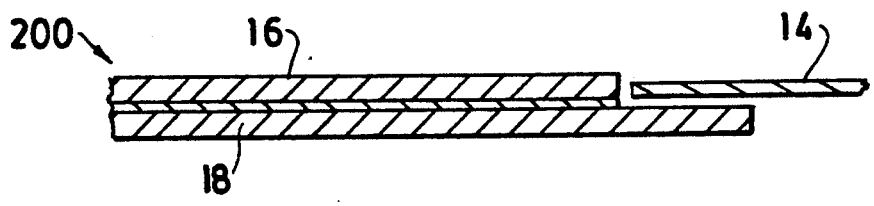
FIG. 8 is a partial cross-sectional view of yet another modified package made in accordance to the present invention illustrating the leader prior to it being secured and folded to the pouch.
Figure 9:
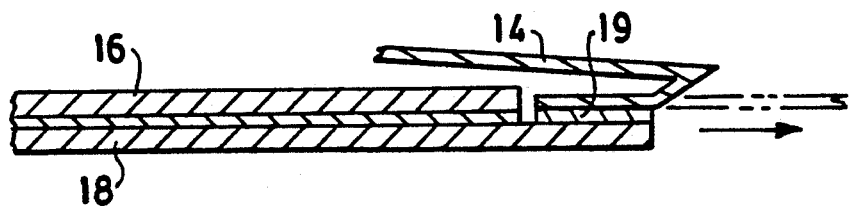
FIG. 9 is a cross-sectional view similar to FIG. 8 illustrating the leader after it has been secured to and folded about the pouch.

Referring to FIGS. 8 and 9, there is illustrated yet another embodiment of the present invention. In particular, there is illustrated a package 200 which is similar to package 10, here again, like numerals indicating like parts. However, in this embodiment, the leader 14 is secured to the lower laminate structure 18. However, the leader 14 is folded back upon itself so that when it is in the unfolded condition for removal of the package, as illustrated by dash lines in FIG. 9, only a shearing force will be applied between the leader and the adjacent laminate structure to which it is secured.

Figure 10:
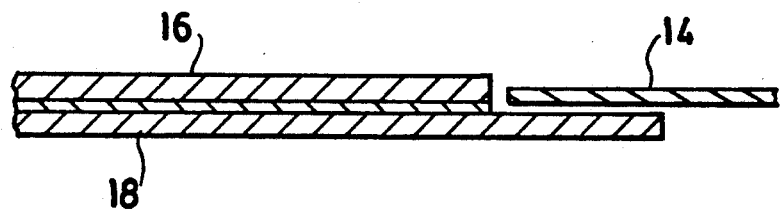
FIG. 10 is a partial cross-sectional view of still another modified package made in accordance to the present invention illustrating the leader prior to it being secured to and folded about the pouch.
Figure 11:
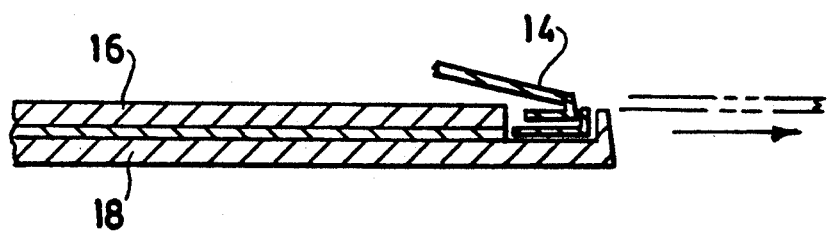
FIG. 11 is a cross-sectional view similar to FIG. 10 illustrating the leader secured to and folded about the pouch.

Referring to FIGS. 10 and 11, there is illustrated yet another modified package made in accordance with the present invention. In particular, there is illustrated a package 300, similar to package 10, like numerals also indicating like parts. This embodiment is also very similar to that illustrated in FIGS. 8 and 9, except that a portion of the lower laminate structure 18 is folded upward as illustrated. Here again, when the leader 14 is in the position for removal of the package from the sheets, as indicated by dash lines in FIG. 11, there is only a pulling force between the leader and the adjacent laminate structure to which it is secured.

As can be seen from the foregoing, Applicant has provided an improved package wherein the leader may be securely attached to the pouch while also providing a pouch capable of retaining printed material directly on the outer surface of the pouch.

It is to be understood that various other changes and modifications may be made without departing from the scope of the present invention, the present invention being limited by the following claims.

I claim:

1. A package for enclosing a plurality of sheets of a photosensitive material, the package comprising:
   a pouch for enclosing the sheets, the pouch having a first laminate structure and a second laminate structure located in generally parallel planes, means sealing the laminate structures together around the sheets, said first and second laminate structures each having an inner layer made of a first material and an outer layer made of a second material, said first and second laminate structures each having a leading edge, the first and second laminate structures being positioned such that the inner layers of said first and second structures face each other and the leading edge of the first laminate structures extends past the leading edge of the second laminate structure so as to form an attachment section in said first laminate structure, the sheets being positionable between the first and second laminate structures, and
   a leader secured to the inner layer of said attachment section.

2. A package according to claim 1 wherein said inner layer of said attachment section is made of a low density polyethylene.

3. A package according to claim 1 wherein said outer layer of said attachment section is made of polypropylene.

4. A package according to claim 1 wherein the leader is secured to the attachment section in such a manner such that when a force is applied to the leader so as to cause the pouch to be removed from the sheets substantially no peeling action is applied between the inner layer of said attachment section and the leader.

5. A package according to claim 1 wherein said leader is positioned entirely over the outer surface of the outer layer of said attachment section.

6. A package according to claim 1 wherein said leader is secured to said attachment section by an adhesive.

7. A package according to claim 1 wherein said leader is secured to said attachment section by heat sealing means.

8. A package according to claim 1 wherein said inner layer is made of polyester.

9. A package according to claim 1 wherein said inner layer is made of nylon.

10. A package according to claim 4 wherein said leader is secured to the inner layer so that the free end can be folded back against the surface of the pouch.

11. A package according to claim 10 wherein the leader lies adjacent the laminate structure to which it is secured.

12. A package according to claim 1 wherein said first and second laminate structure further comprise a middle layer disposed between said inner and outer layers.

13. A package according to claim 12 wherein middle layer is made of MET.

* * * * *

UNITED STATES PATENT AND TRADEMARK OFFICE
CERTIFICATE OF CORRECTION

PATENT NO. : 5,257,697

DATED : November 2, 1993

INVENTOR(S) : Thomas J. Kausch

It is certified that error appears in the above-indentified patent and that said Letters Patent is hereby corrected as shown below:

Column 6, line 16, please insert the following omitted claim 6.
--6. A package according to claim 1 wherein the leader includes a inner edge which is secured to the attachment section and the remaining portion of the leader is folded about the end of said attachment section so that the outer end of the leader lies adjacent the outer surface of either the first or second laminate structure.--

Column 6, line 16, "6." should read --7.--

Column 6, line 19, "7." should read --8.--

Column 6, line 22, "8." should read --9.--

Column 6, line 24, "9." should read --10.--

Column 6, line 26, "10." should read --11.--

Column 6, line 29, "11." should read --12.--, and "10" should read --11--.

Column 6, line 32, "12." should read --13.--

UNITED STATES PATENT AND TRADEMARK OFFICE
CERTIFICATE OF CORRECTION

PATENT NO. : 5,257,697
DATED : November 2, 1993
INVENTOR(S) : Thomas J. Kausch

It is certified that error appears in the above-indentified patent and that said Letters Patent is hereby corrected as shown below:

Column 6, line 35, "13". should read --14.--, and "12" should read --13--.

Signed and Sealed this

Seventeenth Day of May, 1994

Attest:

BRUCE LEHMAN

*Attesting Officer*  *Commissioner of Patents and Trademarks*